United States Patent [19]

Saikalis

[11] Patent Number: 5,544,079
[45] Date of Patent: Aug. 6, 1996

[54] SMART MASS GAS FLOW SENSOR

[75] Inventor: George Saikalis, West Bloomfield, Mich.

[73] Assignee: Hitachi America, Ltd., Tarrytown, N.Y.

[21] Appl. No.: 275,764

[22] Filed: Jul. 15, 1994

[51] Int. Cl.$^6$ ................................................. G01M 19/00
[52] U.S. Cl. ................................... 364/571.01; 73/118.2; 73/204.14; 123/488; 364/571.03
[58] Field of Search .................................. 364/510, 550, 364/571.01, 571.03, 571.05, 571.07; 73/204.14, 204.18, 204.16, 118.2, 202.5; 123/488

[56] References Cited

U.S. PATENT DOCUMENTS

| | | | |
|---|---|---|---|
| 4,790,182 | 12/1988 | Takahashi et al. | 73/204.21 |
| 4,966,033 | 10/1990 | Nishimura et al. | 73/118.2 |
| 4,986,243 | 1/1991 | Weissler, II et al. | 123/488 |
| 5,353,765 | 10/1994 | Saikalis et al. | 123/438 |

OTHER PUBLICATIONS

"Study on Hot Wire Sensor characteristics Under High Pressure Gaseous Operation", SAE Technical Paper Series 940626, Int. Congress & Exposition, Feb. 28/Mar. 3, 1994.

*Primary Examiner*—Ellis B. Ramirez
*Assistant Examiner*—Edward Pipala
*Attorney, Agent, or Firm*—Gifford, Krass, Groh, Sprinkle, Patmore, Anderson & Citkowski P.C.

[57] ABSTRACT

A smart mass gas flow sensor is having a housing with a bore through which a gas flows in which a sensor in the housing generates an analog signal proportional to the mass gas flow through the housing bore. A digital processor digitally processes the analog signal from the sensor and generates a substantially linear output signal representative of the mass gas flow through the housing bore.

11 Claims, 2 Drawing Sheets

SMART MASS GAS FLOW SENSOR

BACKGROUND OF THE INVENTION

I. Field of the Invention

The present invention relates generally to mass gas flow sensors and, more particularly, to a mass gas flow sensor having on board digital signal processing means.

II. Description of Prior Art

There are many previously known mass gas flow sensors which provide analog output signals proportional to the mass of gas flow through the sensor. One such type of mass gas flow sensor is known as a hot wire sensor. Such hot wire sensors are frequently used in the automotive industry.

In the previously known hot wire sensors, the hot wire sensor includes a housing having a through bore through which a gas flows. Both a hot wire and a cold wire are positioned within a bypass bore in the housing while an analog electronic circuit attempts to maintain the temperature differential between the hot and cold wire at a predetermined amount.

In practice, gas flow through the housing bore cools the hot wire. Consequently, in order to maintain the temperature differential between the hot and cold wire, the current flow through the hot wire is increased by the electronic circuit in an attempt to maintain a constant temperature differential between the hot and cold wire. The increased current flow through the hot wire in effect forms a signal proportional to the mass gas flow through the housing bore.

These previously known hot wire sensors, however, all suffer from a number of disadvantages. One disadvantage of the previously known hot wire sensors is that the signal output from the hot wire sensor comprises a non-linear analog signal. This non-linear analog signal must be subsequently linearized by the main computer controlling the fuel control system before the output from the hot wire sensor can be effectively used by the fuel control system.

A still further disadvantage of these previously known hot wire sensors is that the electronic circuit controlling the current flow, and thus the temperature, of the hot wire are analog in design and frequently included a multiple operational amplifiers, trimming resistors and the like. These previously known analog circuits often times require individual calibration in order to meet acceptable performance standard. Furthermore, due to the analog nature of these previously known hot wire sensors, the accuracy of the hot wire sensor diminished over time.

A still further disadvantage of these previously known hot wire sensors is that it was necessary to individual design the analog electronic circuit for different types of gases such as air, methane, CNG (compressed natural gas), propane and the like. Consequently, it was difficult to adapt a single hot wire sensor to different types of gaseous flow.

A still further known disadvantage of these previously known hot wire sensors is that it was necessary to provide the fuel management system with an input signal representative of the temperature of the ambient gas, i.e. the temperature of the gas flowing across the cold wire. Consequently, it was necessary to include a thermocouple or other temperature sensing means in the hot wire sensor and to provide the output from the thermocouple or temperature sensor to the analog circuit controlling the current flow through the hot wire.

SUMMARY OF THE PRESENT INVENTION

The present invention provides a mass gas flow sensor which overcomes all of the above mentioned disadvantages of the previously known devices.

In brief, the mass gas flow sensor of the present invention comprises a housing having a bore through which a gas flows. The gas may be a fuel, such as propane, CNG, methane or the like, or air.

Flow and temperature sensing means, such as a hot and cold wire, are positioned in the bore for sensing the mass gas flow through the bore and for generating an analog signal proportional to the mass gas flow. Consequently, the physical construction of the housing with the through bore and the hot and cold wire of the present invention is very similar to the previously known hot wire sensors.

Unlike the previously known devices, however, the present invention includes means within the housing for digitally processing the analog signal from the flow sensors and for thereafter generating a substantially linear output signal representative of the mass gas flow sensor through the housing bore. In the preferred embodiment of the invention, the analog signals from the hot and cold wires are converted from an analog signal to a digital signal by an analog/digital converter and coupled as input signals to a microprocessor. The microprocessor, under program control, then controls a power driver through a digital/analog converter. The power driver in turn controls the amount of current flowing through the hot wire and thus maintains the temperature differential between the hot and cold wire at a predetermined constant.

The microprocessor under program control linearizes the non-linear output from the hot and cold wire and, digitally filters the signal. The microprocessor then generates the filtered digital signal through a digital/analog converter thus providing a linear analog output signal from the mass gas flow sensor. This linear output signal is representative of the mass of gas flow through the gas sensor and can be either a variable voltage or, alternatively, a variable frequency.

The microprocessor also preferably provides an output signal through a digital/analog converter representative of the temperature of the cold wire and thus the ambient temperature of the gas flowing through the gas flow sensor. A digital/analog converter then generates a linear analog output signal representative of the temperature of the ambient gas flowing through the gas flow sensor. This temperature signal can then be used by the fuel control system for any desired purpose, e.g. compensation for fuel density changes.

The microprocessor or digital signal processor (DSP) preferably operates under software control stored in a programmable ROM. This programmable ROM, furthermore, preferably contains look up tables representative of the necessary constants, calibration constants, etc. necessary to convert the data from the hot and cold wires to a linear signal representative of the mass of gas flow and temperature. Consequently, by simply reprogramming the ROM with different look up tables, equations or the like, the same mass gas flow sensor can be utilized for different gases as well for different size flow meters. Consequently, the previously known necessity of individually designing the mass gas flow sensor for different types of gases is eliminated.

Still further advantages of the present invention will become hereinafter apparent with reference to the following detailed description of the invention.

BRIEF DESCRIPTION OF THE DRAWING

A better understanding of the present invention will be had upon reference to the following detailed description, when read inconjunction with the accompany drawing, wherein like reference characters refer to like pans throughout the several views, and in which.

DETAILED DESCRIPTION OF PREFERRED EMBODIMENTS OF THE PRESENT INVENTION

Figure 1:
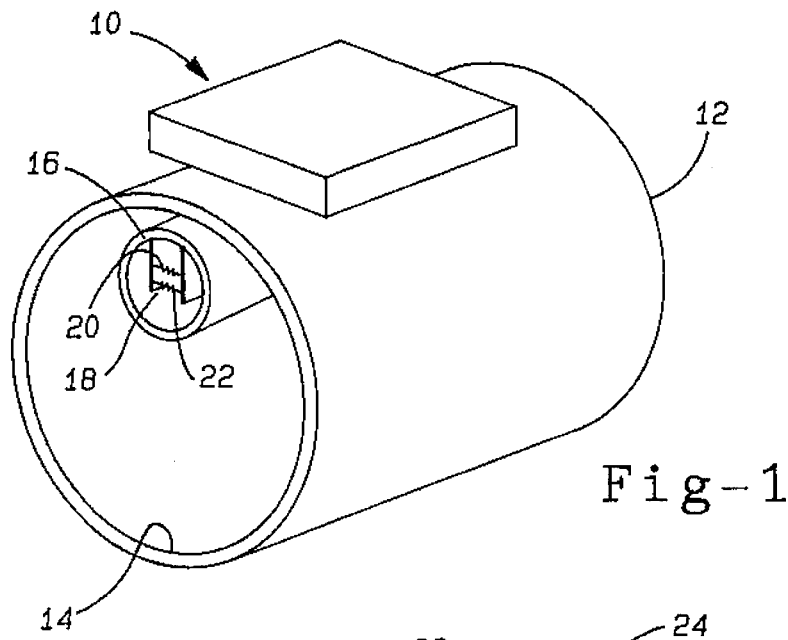
FIG. 1 is a diagrammatic view illustrating a preferred embodiment of the mass gas flow sensor of the present invention.

With reference first to FIG. 1, a mass gas flow sensor 10 is thereshown having a housing 12. The housing 12 includes a through bore 14 through which the gas passes. The gas, furthermore, may be any type of gas, such as air, propane, CNG, methane and the like.

Still referring to FIG. 1, a bypass tube 16 is also positioned within the housing bore 14 so that a portion of the gas entering the housing 14 passes through the bypass tube 16. A flow sensor 18 is contained within the bypass tube 16 and generates a analog signal proportional, but typically non-linear, to the mass of gas flow through the housing bore 14.

In the preferred embodiment of the invention, the flow sensor 18 comprises a hot wire 20 and cold wire 22. A electronic circuit contained in the housing 12, which will be subsequently described in greater detail, maintains the temperature differential between the hot wire 20 and cold wire 22 at a predetermined amount, e.g. 200° C., by varying the current flow through the hot wire 20. The current flow through the hot wire 20 in effect forms the analog output signal representative of the mass of gas flow through the housing bore 14. Furthermore, the hot wire 20 and cold wire 22 are conventional in construction and are typically constructed of platinum wire.

Figure 2:
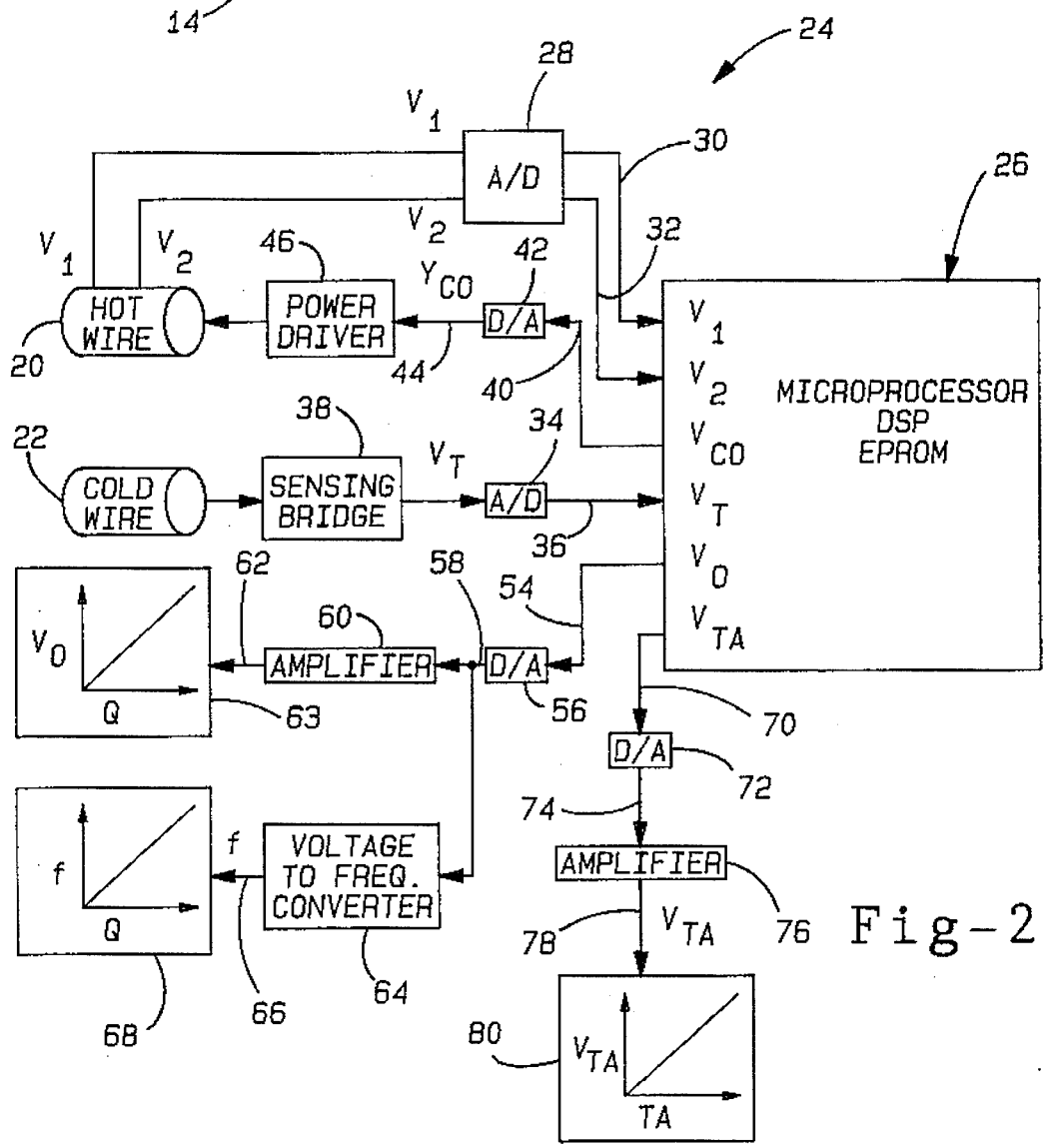
FIG. 2 is a schematic view illustrating a preferred embodiment of the invention.

Referring now to FIG. 2, a block diagrammatic view of the electronic circuit for both monitoring the hot wire and cold wire 22 as well as providing an output signal representative of the mass gas flow through the bore 14 is thereshown. The circuit 24 is contained within the housing 12 for the mass gas flow sensor 10.

Still referring to FIG. 2, the circuit 24 includes digital processing means 26, such as microprocessor or a digital signal processor (DSP). The voltages $V_1$ and $V_2$ representing the voltages across the hot wire 20 are coupled as an input signal to the digital processor 26 through an analog/digital. (A/D) converter 28. This A/D converter 28 thus provides digital signals on its output lines 30 and 32 representative of the voltages $V_1$ and $V_2$ across the hot wire 20 to the processor 26.

Similarly, the cold wire provides an input signal $V_T$ via an A/D converter 34 on line 36 to the processor 26. This input signal on line 36 to the processor 26 is thus representative of the temperature of the cold wire 22 and thus of the ambient gas temperature. A conventional sensing bridge 38, such as a Wheatstone bridge is connected between the cold wire 22 and the A/D converter 34 to produce the signal $V_T$.

As previously described, for optimum efficiency and accuracy, the temperature differential between the hot wire 20 and cold wire 22 should be maintained at a predetermined constant, e.g. 200° C. In order to achieve this, the processor 26 generates a digital signal on an output line 40 to a digital/analog (D/A) converter 42. The D/A converter 42 then converts the digital signal from the line 40 to an analog signal and provides this analog signal as a variable control voltage $V_{co}$ on output line 44.

Figure 4:
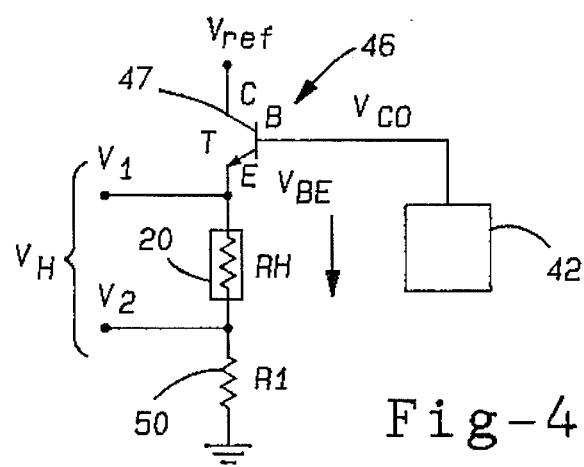
FIG. 4 is a schematic view illustrating a portion of the preferred embodiment of the invention.

The control voltage $V_{co}$ on line 44 is then coupled through a power driver 46 to control the current flow through the hot wire 20. As best shown in FIG. 4 the power driver 46 preferably comprises a transistor 47 having its collector connected to a constant voltage source and its emitter connected to one end of the hot wire 20. The opposite end of the hot wire 20 is connected through a resistor 50 to ground while the control voltage $V_{co}$ is provided as an input signal to the base of the transistor 46. Consequently, a change in the control voltage $V_{co}$ in turn controls the conduction of the transistor 47 and, likewise, the magnitude of current flow through the hot wire 20.

Referring again to FIG. 2, the processor 26 also generates a digital signal on its output line 54 which is representative of the mass of gas flow through the flow meter. The actual program to compute the mass gas flow will be subsequently described in greater detail. However, in FIG. 2, the digital signal on line 54 is coupled through a D/A converter 56 which provides an analog output signal $V_o$ as an output signal 58. This analog signal 58 is then amplified by an amplifier 60 which generates an output on line 62 representative of the mass of gas flow through the mass gas flow sensor 10. The relationship between the output voltage $V_o$ on line 62 and the mass of gas flow Q is illustrated by chart 63 in FIG. 2.

The output $V_o$ on line 58 is also coupled as an input signal to a voltage to frequency converter 64. This voltage to frequency converter 64 provides a signal f on its output line 66 which is frequency signal proportional to the mass of gas flow through the sensor 10. The relationship between the frequency f to the mass of gas flow Q is illustrated by chart 68.

As is evident from the charts 63 and 68 in FIG. 2, in a fashion that will be subsequently described in greater detail, the processor 26 digitally processes the non-linear outputs from the hot wire 20 and cold wire 22, and produces a linear output on the output line 62 and 66. Consequently, further linearization of the output signals on the output line 62 and 66 is unnecessary.

Still referring to FIG. 2, the processor 26 provides a digital signal on output line 70 representative of the temperature $T_A$ of the cold wire 22. This temperature signal is coupled through a D/A converter 72 which provides an analog signal on its output 74 representative of the temperature of the cold wire 22. This voltage from line 74 is amplified by an amplifier 76 which provides an output signal $V_{TA}$ on its output 78. This output signal is represented by the chart 80 and, like the voltage signal $V_o$ and f, is also a linear signal.

Figure 3A:
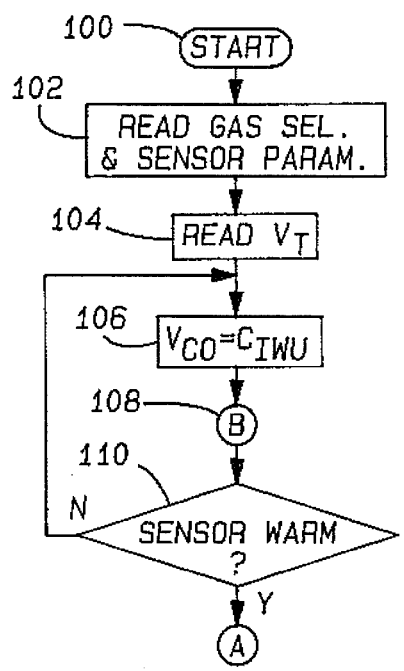
FIG. 3a, 3b and 3c are flow charts illustrating the operation of a preferred embodiment of the present invention.
Figure 3B:
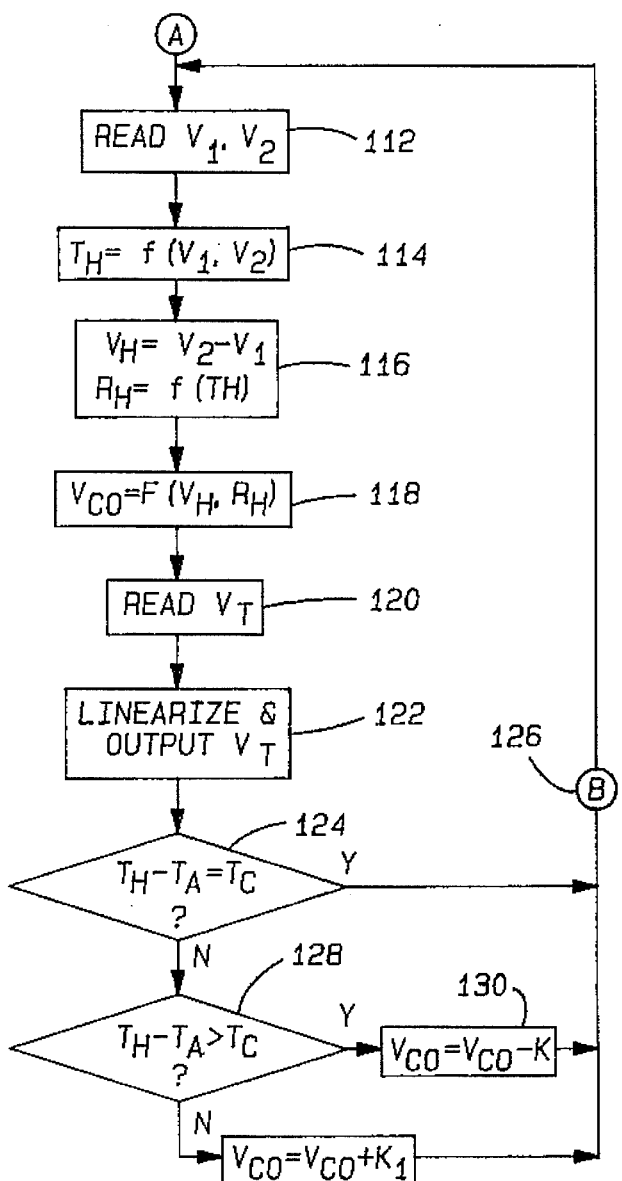
Figure 3C:
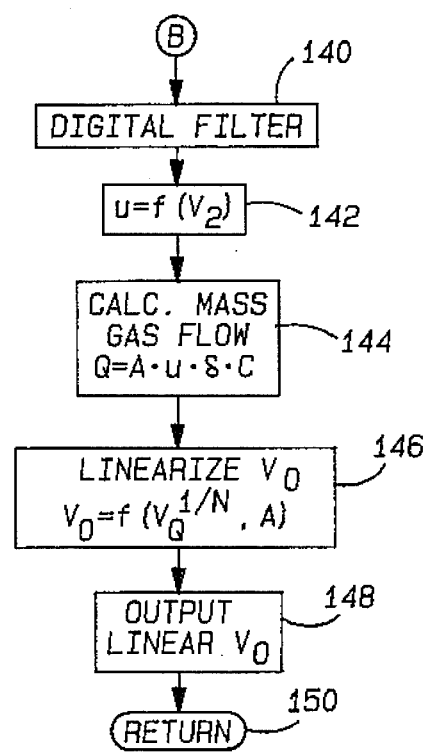

With reference now to FIGS. 3a–3c, the operation of the digital processor 26 is thereshown. With reference first to FIG. 3a, the program starts at step 100 and then branches to step 102 in which the program reads the various constant and parameters relating to the particular gas selection, i.e. air, methane, CNG, propane and the like, as well as parameters relating to the particular sensor design. These gas parameters will include, for example, the specific gravity δ at various temperatures $T_A$. Similarly, the design parameters for the particular sensor would include the bore area A of the bore 14 as well as the Nusselt index N. After the initial parameters in constants are read at step 102, step 102 branches to step 104.

At step 104, the processor 26 reads the cold wire voltage $V_T$ which is proportional to the temperature of the ambient temperature passing through the housing bore 14 (FIG. 1) Step 104 then branches to step 106 which sets the output voltage $V_{co}$ to a predetermined constant $C_{Iwu}$. The voltage $V_{co}$ represents the voltage which is outputed by the processor 26 on line 40 (FIG. 2) to control the current flow through the hot wire 20 and the constant $C_{Iwu}$ represents a preselected constant representative of the voltage $V_{co}$ during the initial sensor warm up.

Step 106 then branches to step 108 which calls a sub-routine for linearizing and outputing the various parameters from the sensor. This sub-routine will be subsequently described in greater detail.

Step 108 then branches to step 110 which determines if the sensor is warm. If not, step 110 branches to step 104 where the above process is repeated. Otherwise, step 110 branches to the program illustrated in FIG. 3b.

With reference now to FIG. 3b, following sensor warm up, step 110 (FIG. 3a) branches to step 112 where the processor 26 reads the voltages $V_1$ and $V_2$, i.e. the voltages across the hot wire 20. Step 112 then branches to step 114 in which the temperature $T_H$ of the hot wire 20 is computed as a function of $V_1$ and $V_2$ in accordance with the following formula:

$$TH = \frac{\left\{ \left[ \frac{R_1}{R_0} \left( \frac{V_1}{V_2} - 1 \right) \right] - 1 \right\}}{\alpha}$$

where $R_1$=resistance of resistor 50 (FIG. 4)

$R_o$=resistance of hot wire 20 (FIG. 4) at 0° C.

$\alpha$=constant representing change in resistance as a function of temperature for the hot wire Step 114 then branches to step 116 in which the program calculates the voltage $V_H$ across the hot wire as well as the resistance of the hot wire are $_H$ in accordance with the following formula:

$$V_H = V_2 - V_1$$

$$R_H = R_o(1 + \alpha TH)$$

Step 116 then branches to step 118.

Step 118 then calculates the voltage $V_{co}$, i.e. the control voltage for current flow through the hot wire, in accordance with the following formula:

$$V_{co} = V_H \left( 1 + \frac{R_1}{R_H} \right) + V_{BE}$$

where $V_{BE}$=base-emitter voltage of transistor 46 (FIG. 4)

Step 118 then branches to step 120 where the processor 26 reads the voltage $V_T$, i.e. the voltage of the cold wire, which is representative of the temperature of the gas. Step 120 then branches to step 122 which linearizes the output $V_T$ and provides an output signal on line 70 (FIG. 2) representative of the temperature of the gas flow.

Step 122 then branches to step 124 which compares the difference between the temperature of the hot wire and the cold wire to a preset constant $T_c$. For maximum efficiency and accuracy of the hot wire sensor 18, the temperature differential between the hot wire 20 and the cold wire 22 must be maintained at a preset constant, e.g. 200° C.

Assuming that the temperature differential between the hot and cold wires 20 and 22 equals the preset constant $T_c$, step 124 branches to the output sub-routine at step 126 which will be subsequently described in greater detail. Conversely, if the temperature differential between the hot and cold wires 20 and 22 does not equal $T_c$, step 124 instead branches to step 128.

At step 128, the program determines if the temperature differential between the hot and cold wire is greater than the preset constant $T_c$. If so, step 128 branches to step 130 in which the output voltage $V_{co}$ is decremented by a preset constant K and step 130 then branches to the output sub-routine at step 126.

Conversely, if the temperature differential between the hot and cold wire is less than $T_c$ step 128 instead branches to step 132 in which the voltage $V_{co}$ is incremented by a preset constant $K_1$ which may be the same as a constant K in step 130. Step 132 then branches to the output sub-routine at step 126.

The output voltage $V_{co}$ controls the current flow through the hot wire 20 (FIG. 4) and it is this voltage which is also indicative of the mass gas flow through the sensor. Furthermore, as discussed above, for optimum accuracy, the temperature differential between the hot and cold wires should be maintained at the predetermined constant $T_c$. Consequently, steps 124, 128, 130 and 132 form an adaptive system to ensure that the temperature differential between the hot and cold wire remain substantially at the preset temperature constant $T_c$ despite changes in gas flow.

Step 126 (FIG. 3b) and step 108 (FIG. 3a) both call a sub-routine which determines and generates the output signals representative of the mass gas flow through the flow meter. This sub-routine is illustrated in FIG. 3c.

With reference then especially to FIG. 3c, the voltage signal $V_2$ is digitally filtered at step 142 and then branches to step 140. Any conventional digital filtering routine can be employed at step 142. At step 140, the gas flow velocity u is first determined as a function of $V_2$, i.e. the voltage at the hot wire sensor. Preferably a look up table read at step 102 (FIG. 3a) is used to determine u as a function of $V_2$.

Step 140 then branches to step 144 where the mass gas flow Q is calculated in accordance with the following formula:

$$Q = A \cdot u \cdot \delta \cdot C$$

where

A=bore area in sensor housing u=gas velocity $\delta$=specific gravity of gas at temp. $T_A$ c=calibration constant The voltage $V_Q$ which varies as a function of Q is also determined from a look up table read as data in step 102. Such a look up table is typically determined empirically.

Step 144 then branches to step 146 where the program linearizes the output $V_o$, i.e. the output representative of the mass gas flow through the sensor housing in accordance with the following formula:

$$V_o = K_2 \cdot f(V_Q \circ N) + K_3$$

where $K_2$=a constant

N=Nusselt index $K_3$=offset constant

Step 146 then branches to step 148 where the processor outputs the now linear value $V_o$ on output line 54 (FIG. 2)

to the D/A converter 56. Then, as previously described, the amplifier 60 and voltage and frequency converter 64 (FIG. 2) provide the now linear voltage and frequency output signals representative of the mass gas flow through the sensor. Step 148 then branches to step 150 and returns to the main program.

From the forgoing, it can be seen that the mass gas flow sensor of the present invention achieves a number advantages over the previously known devices. In particular, by using an on board microprocessor or digital signal processor, the sensor of the present invention both calculates and outputs a linear output signal directly proportional to the mass gas flow through the sensor. Further calculation by the main microprocessor controlling the fuel management system is unnecessary.

Similarly, only simple reprogramming of the microprocessor ROM with different constants is necessary in order to accommodate different gases utilizing the same sensor. Such simple programming can be easily accomplished through an EPROM.

The present invention further utilizes an adaptive control method to maintain the temperature differential between the hot and cold wire at the predetermined constant. This, in turn, achieve maximum efficiency and accuracy for the flow meter.

The utilization of digital filtering techniques also improves the overall performance for the sensor.

The present invention also provides an output representative of the temperature of the cold wire sensor and thus the ambient temperature of the gas flowing through the sensor. Linearization of the output temperature signal is also provided. This advantageously eliminates the need for a thermocouple or other temperature sensor to sense the temperature of the gas flow.

Having described my invention, however, many modifications thereto will become apparent to those skilled in the art to which it pertains without deviation from the spirit of the invention as defined by the scope of the appended claims.

I claim:

1. A mass gas flow sensor comprising a housing, said housing having a bore through which a gas flows, means in saint bore for sensing mass gas flow through the bore and for generating an analog signal proportional to said mass gas flow, said sensing means comprising a hot wire and a cold wire, said hot and cold wires being positioned in said bore, circuit means contained in said housing for digitally maintaining a predetermined differential temperature between said hot and cold wire, for digitally processing said analog signal and for generating an output signal which is substantially linear with respect to the mass gas flow through said bore of said housing, and means for generating an output signal representative of the temperature of the cold wire.

2. The invention as defined in claim 1 wherein said digital processing means comprises a microprocessor.

3. The invention as defined in claim 1 wherein said digital processing means comprises digital signal processor.

4. The invention as defined in claim 1 wherein said digital processing means comprises means for convening said analog signal to a digitally encoded signal, and means for linearizing said digitally encoded signal and for generating a linear digital output signal representative of said digitally encoded signal.

5. The invention as defined in claim 4 wherein said digital processing means further comprises means for converting said linear digital output signal to a linear output analog signal.

6. The invention as defined in claim 5 wherein said converting means comprises means for generating an analog frequency signal proportional to said digital output signal.

7. The invention as defined in claim 5 and further comprising means for digitally filtering said digital output signal.

8. The invention as defined in claim 1 wherein said means for maintaining said predetermined temperature differential comprises means for iteratively comparing said differential temperature to a preset constant, means for iteratively increasing current flow through said hot wire when said temperature differential is less than said preset constant, and means for iteratively incrementally decreasing current flow through said hot wire when said different temperature is greater than said preset constant.

9. The invention as defined in claim 1 and comprising means for generating an output signal representative of the temperature of the cold wire.

10. The invention as defined in claim 1 wherein said digital processing means comprises a microprocessor, means for programming said microprocessor, said programming means comprising programmable computer memory.

11. The invention as defined in claim 1 wherein said means for generating an output signal representative of the temperature of the cold wire further comprises means for generating a linear output signal representative of the temperature of the cold wire.

* * * * *

UNITED STATES PATENT AND TRADEMARK OFFICE
CERTIFICATE OF CORRECTION

PATENT NO. : 5,544,079
DATED : August 6, 1996
INVENTOR(S) : George Saikalis

It is certified that error appears in the above-indentified patent and that said Letters Patent is hereby corrected as shown below:

Column 3, line 2, "pans" should be --parts--.
Column 3, line 31, "A" should be --An--.
Column 3, line 53, after "digital" delete ".".
Column 3, line 53, "AID" should be --A/D--.
Column 4, line 14, "46" should be --47--.
Column 7, line 24, "achieve" should be --achieves--.
Column 7, line 44, "saint" should be --said--.

Signed and Sealed this

Eighteenth Day of March, 1997

Attest:

BRUCE LEHMAN

Attesting Officer

Commissioner of Patents and Trademarks